(12) United States Patent
Duga et al.

(10) Patent No.: US 6,679,076 B1
(45) Date of Patent: Jan. 20, 2004

(54) CENTRIFUGAL CHILLER WITH HIGH VOLTAGE UNIT-MOUNTED STARTERS

(75) Inventors: Joel S. Duga, Onalaska, WI (US); John A. Komperud, La Crosse, WI (US); Richard M. Heiden, Holmen, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 10/419,451

(22) Filed: Apr. 17, 2003

(51) Int. Cl.$^7$ ................................................ F25B 49/00
(52) U.S. Cl. ........................................ 62/228.1; 62/498
(58) Field of Search ........................... 62/228.1, 228.5, 62/478, 498; 415/17

(56) References Cited

U.S. PATENT DOCUMENTS

| | | | | |
|---|---|---|---|---|
| 5,553,997 A | * | 9/1996 | Goshaw et al. | 415/17 |
| 6,427,464 B1 | * | 8/2002 | Beaverson et al. | 62/196.3 |
| 6,564,560 B2 | * | 5/2003 | Butterworth et al. | 62/84 |

OTHER PUBLICATIONS

TRANE Engineering Drawing 4535–3196 Starter Mounting.
TRANE Engineering Drawing 4535–3347 Starter Installation.

* cited by examiner

Primary Examiner—Melvin Jones
(74) Attorney, Agent, or Firm—William J. Beres; William O'Driscoll

(57) ABSTRACT

A centrifugal chiller includes both a unit-mounted full-voltage starter and a unit-mounted reduced-voltage starter. The chiller is rather large with a rated cooling capacity of at least 300 tons and is driven by a motor that is powered by at least 2,000 volts. The chiller includes an evaporator shell and a condenser shell in a staggered arrangement to provide a combined height of between 6 and 12 feet and a combined width of between 5 and 8.5 feet. The staggered arrangement of the shells plus mounting the two starters at opposite sides of the motor provide a chiller whose outer dimensions permit the chiller to be shipped as a single package without exceeding certain shipping limits.

20 Claims, 4 Drawing Sheets

CENTRIFUGAL CHILLER WITH HIGH VOLTAGE UNIT-MOUNTED STARTERS

BACKGROUND OF THE INVENTION

1. Field of the Invention

The subject invention generally pertains to refrigerant systems and more specifically to unit-mounted starters for centrifugal chillers.

2. Description of Related Art

Typical centrifugal chillers are refrigerant systems that includes a centrifugal compressor driven by an electric motor. The cooling capacity of the chiller may range from a few tons to a thousand tons or more. The smaller units often operate at 480 volts or less and can be turned on and off by a full-voltage starter, which selectively applies or removes the full supply voltage to the motor.

Larger chillers that can provide at least 300 tons of cooling are often powered by higher voltages of 2,000 volts or more. The higher voltage means less current is needed for a given size motor, and less current means lighter gauge power supply lines and/or less power losses in the wires. However, suddenly applying or removing a full 2,000+ volts across the motor leads can place a significant load on a facility's electrical supply system and can be quite a shock to the motor, compressor, and the contactors that switch the power on and off. Consequently, such units often employ some type of reduced-voltage starter, whereby reduced voltage is applied at startup, and full voltage is applied shortly thereafter.

Perhaps the three most common types of reducedvoltage starters are the primary reactor, autotransformer, and solid-state starter. A primary reactor includes a resistor in series with each power line leading to the motor. A set of contacts serves as a shunt across each resistor to effectively add or remove the resistor from its respective line. When the contacts open, the resistors reduce the line voltage to the motor for reduced-voltage starting. When the contacts close, the current bypasses the resistors to apply full voltage to the motor during normal operation. An autotransformer includes a transformer with multiple leads that a set of contacts selectively taps to apply full-voltage or reduced-voltage across the motor leads. A solid-state starter includes at least one solid-state electrical "switching" device (e.g., SCR, triac, diac, power transistor, etc.) that interrupts or changes the waveform of the power leading to the motor to deliver less power to the motor at startup, and full power afterwards.

For typical higher voltage chillers, a full-voltage starter and/or a reduced-voltage starter are often contained within a single enclosure that is installed off the unit in an electrical room or in another area within the building served by the chiller. The starters are often installed alongside other electrical equipment of the building. Main electrical supply lines of the building lead to the full-voltage starter, which in turn feeds the reduced-voltage starter. Wires from the reduced-voltage starter convey the electrical power to the motor. The reduced-voltage starter provides reduced voltage to the motor at startup and full voltage afterwards.

Installing a higher voltage chiller separate from its full-voltage and reduced-voltage starters adds cost and time to the initial installation of the chiller because of the extra electrical work that is required in the field to install the two starters. Unit-mounted starters are commonly found on relatively small chillers; however, larger chillers are different.

Larger chillers generally have larger starters, yet they have less room for them because of shipping rules that limit a chiller's overall physical size. Although some full-voltage starters have been mounted to larger chillers (i.e., at least 300 tons and over 2,000 volts), such large chillers have not been known to include both a unit-mounted full-voltage starter and a unit-mounted reduced-voltage starter. The physical size of such chillers, even without any unit-mounted starters, is often already pushing the allowable envelope for normal shipping. And starters for larger chillers are quite heavy and bulky, which can make them difficult to mount to a chiller.

Moreover, certain areas on a chiller should be left clear of obstructions to provide room for maintenance, lifting, and to meet applicable codes and regulations. Other areas of the chiller may be taken up by chilled water piping, condenser water piping, a purge unit, a control panel, an economizer, and various sensors. In the end, there is often insufficient room left on the chiller for installing bulky unit-mounted starters.

Consequently, there is a need for providing a strategic location and method for mounting both a full-voltage starter and a reduced-voltage starter to a relatively large centrifugal chiller while still being able to use standard modes of shipping.

SUMMARY OF THE INVENTION

To provide a large centrifugal chiller with both a full-voltage starter and a reduced-voltage starter, it is an object of some embodiments of the invention to install the two starters in their own separate enclosure rather than in the same one. For larger chillers, it can be easier to find room to mount two smaller enclosures than to find room for a single, much larger enclosure.

Another object of some embodiments is to reduce the time and cost of installing a large centrifugal chiller.

Another object of some embodiments is to mount both a full-voltage starter and a reduced-voltage starter to a large centrifugal chiller without exceeding maximum dimensions of standard shipping methods.

Another object of some embodiments is to create a convenient user interface with a large centrifugal chiller by mounting a control panel and a full-voltage motor starter on one side of the chiller's motor and mounting a reduced-voltage starter on the opposite side of the motor. This arrangement can make the control panel and full-voltage starter more accessible than the reduced-voltage starter, which can be a benefit in cases where the reduced-voltage starter requires less attention by operators and service personnel.

Another object of some embodiments is to mount a relatively heavy starter enclosure atop a condenser or evaporator shell and to mount a lighter starter enclosure in a more off centered position to one of the shells, whereby the heavier enclosure receives substantial vertical support, and the lighter enclosure is readily accessible.

Another object of some embodiments is to place an evaporator shell and condenser shell in a staggered arrangement that provides room for two separately mounted motor starters.

Another object of some embodiments is to route a chiller's electrical power first into a full-voltage starter enclosure, then into a reduced-voltage starter enclosure, and then back to the full-voltage starter enclosure before delivering the power to the motor. This allows the full-voltage starter enclosure to be placed in a location that is accessible to a user, adjacent to the motor leads, and convenient for feeding the main power supply lines to the chiller. Also, the reduced-voltage starter enclosure can be placed in a more out-of-the-way location that does not interfere with operation or servicing of the chiller.

One or more of these and/or other objects of the invention are provided by a rather large centrifugal chiller that includes both a unit-mounted full-voltage starter and a unit-mounted reduced-voltage starter. The chiller has a rated cooling capacity of at least 300 tons and is driven by a motor that is powered by at least 2,000 volts. The chiller includes an evaporator shell and a condenser shell in a staggered arrangement to provide a combined height of between 6 and 12 feet and a combined width of between 5 and 8.5 feet.

BRIEF DESCRIPTIONS OF THE DRAWINGS

DESCRIPTIONS OF THE PREFERRED EMBODIMENT

Figure 1:
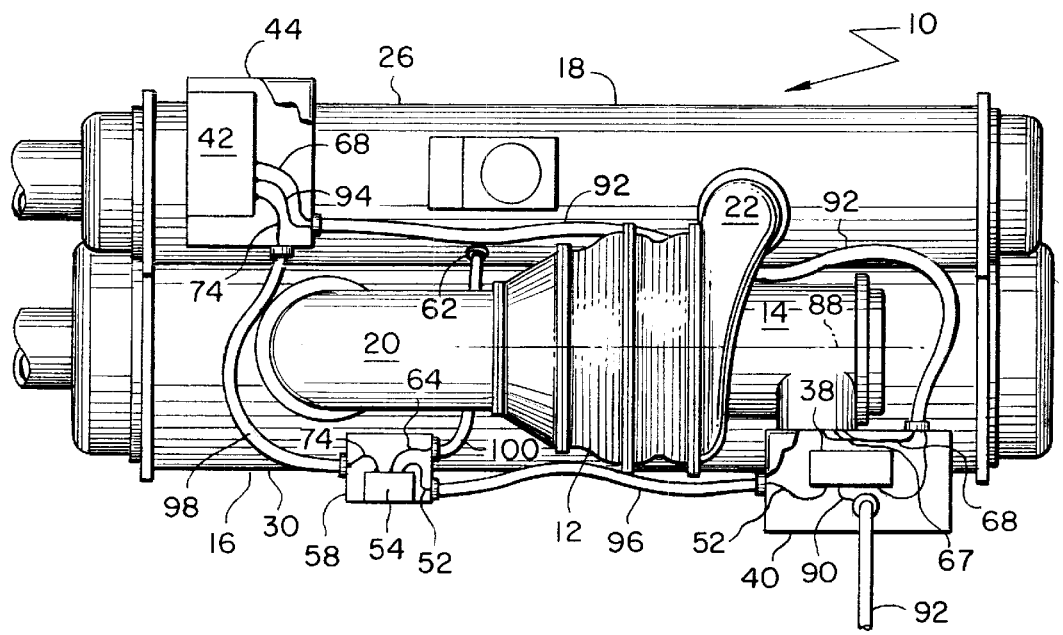
FIG. 1 is a top view of a chiller with the top panels of various electrical enclosures removed to schematically illustrate the contents inside the enclosures.
Figure 2:
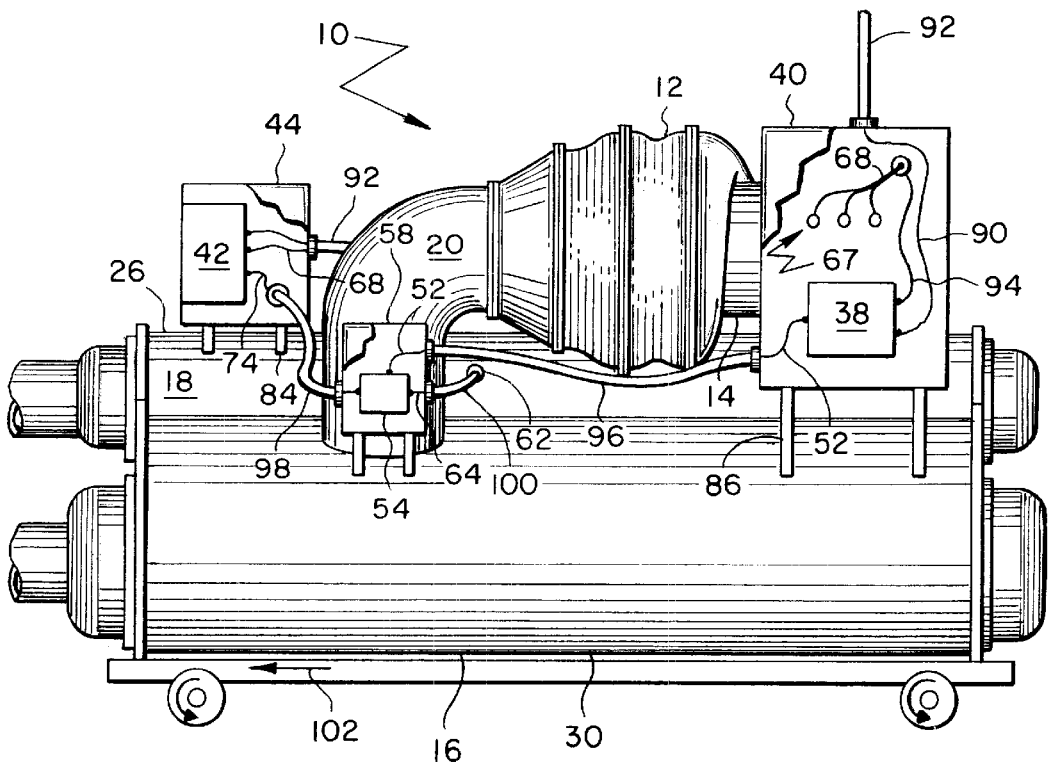
FIG. 2 is a front view of the chiller of FIG. 1 with the front panels of various electrical enclosures removed to schematically illustrate the contents inside the enclosures.
Figure 3:
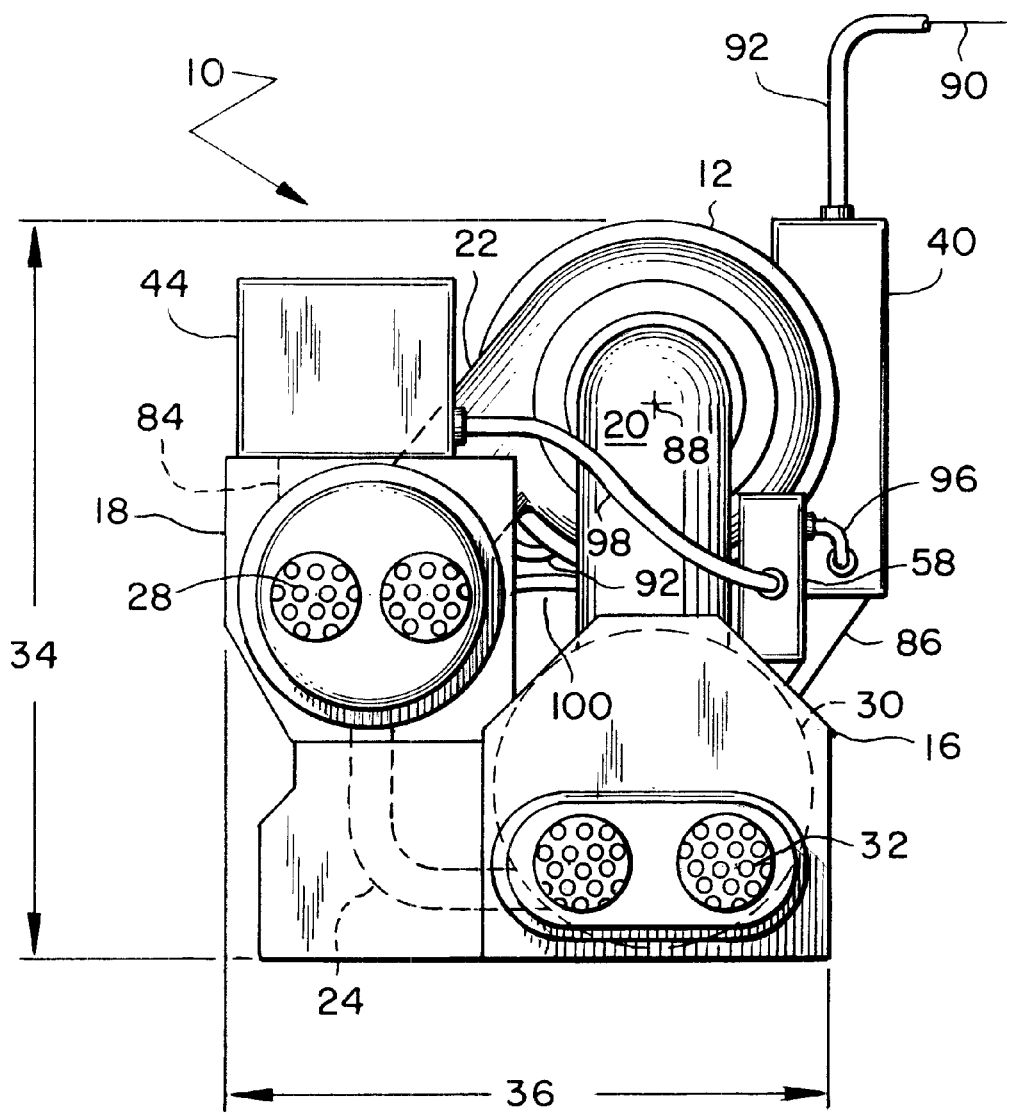
FIG. 3 is a left end view of the chiller of FIG. 2.

FIGS. 1, 2 and 3 respectively show a top, front and left end view of a centrifugal chiller 10. Basic components of chiller 10 include a centrifugal compressor 12, an alternating current motor 14 driving the compressor, an evaporator 16, and a condenser 18. Compressor 12, condenser 18 and evaporator 16 are connected in fluid communication with each other to create a conventional closed-loop refrigerant circuit for providing chilled water.

In basic operation, a suction elbow 20 conveys relatively cool, low-pressure refrigerant gas from evaporator 16 to a suction side of compressor 12. Compressor 12 compresses the refrigerant and discharges it, at a higher pressure and temperature, through a discharge volute 22. Volute 22 delivers the refrigerant to condenser 18, which then condenses the refrigerant. A pipe 24 (and/or an economizer) with a flow restriction conveys the condensed refrigerant from condenser 18 to evaporator 16. As the refrigerant passes through the restriction in pipe 24, the refrigerant cools by expansion. Thus, cool, low-pressure refrigerant returns to evaporator 16 to perpetuate the refrigerant cycle.

Although the actual refrigerant cycle, operation, and structure of chiller 10 may vary, condenser 18 preferably comprises a condenser shell 26 that contains a plurality of heat exchanger tubes 28. Tubes 28 convey cooling water for condensing the refrigerant within shell 18. Evaporator 16 preferably comprises an evaporator shell 30 that also contains a plurality of heat exchanger tubes 32. Relatively cold refrigerant within evaporator shell 30 cools water that is circulated through tubes 32, whereby evaporator 16 provides chilled water for various cooling purposes.

Chiller 10 is rather large in that it has a rated cooling capacity of at least 300 tons; its condenser, evaporator, and compressor have a combined height 34 of between 6 and 12 feet; its condenser and evaporator have a combined width 36 of between 5 and 8.5 feet; and its motor has a rated supply voltage of at least 2,000 volts.

In spite of its size, chiller 10 includes two unit-mounted starters: a full-voltage starter 38 housed within a full-voltage starter enclosure 40 and a reduced-voltage starter 42 contained within a reduced-voltage starter enclosure 44. Together, the two starters 38 and 42 provide a means for soft-starting motor 14. The term, "soft-starting" refers to starting a motor with less than its full rated voltage.

Figure 4:
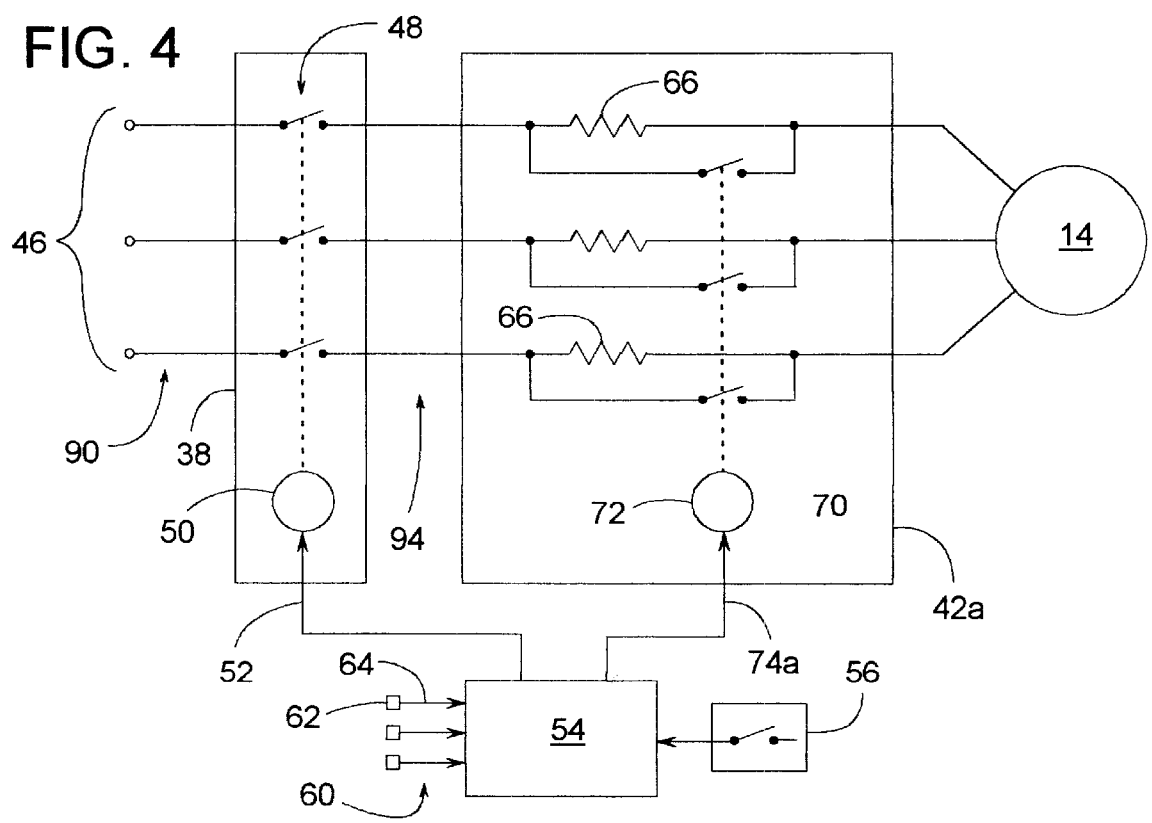
FIG. 4 is a schematic wiring diagram of a full-voltage starter, a reduced-voltage starter, and a controller, wherein the reduced-voltage starter is a primary reactor.
Figure 5:
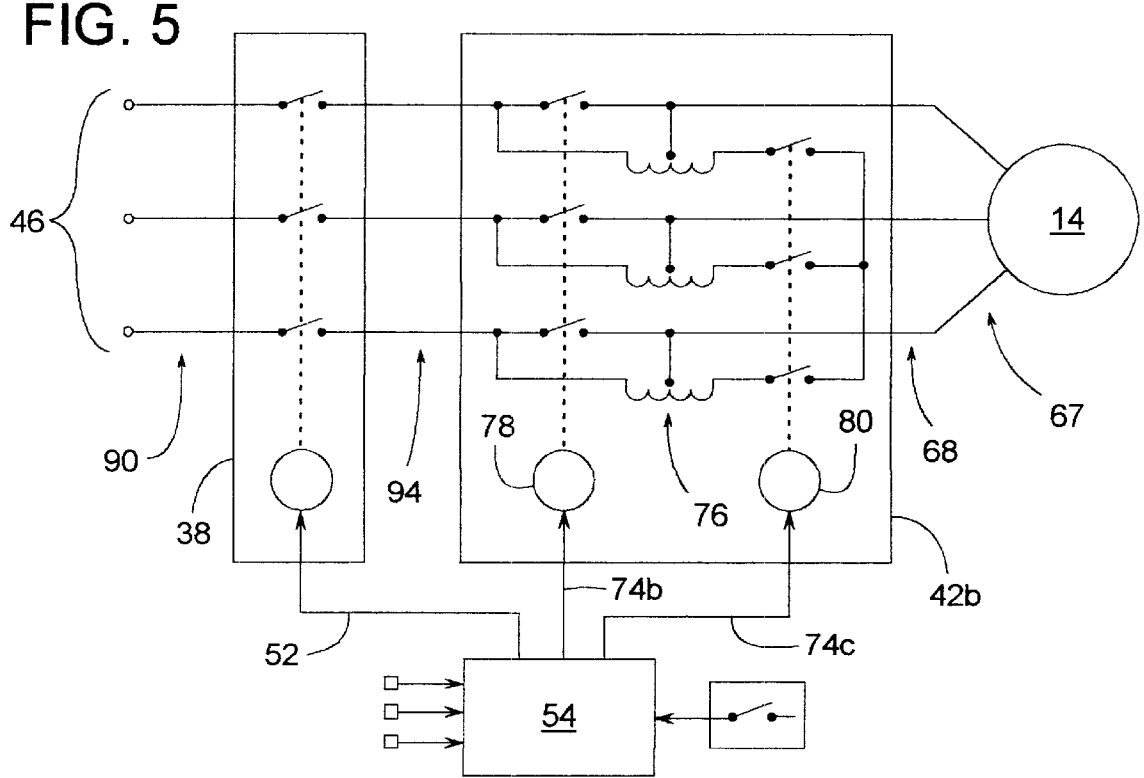
FIG. 5 is a schematic wiring diagram of a full-voltage starter, a reduced-voltage starter, and a controller, wherein the reduced-voltage starter is an autotransformer.
Figure 6:
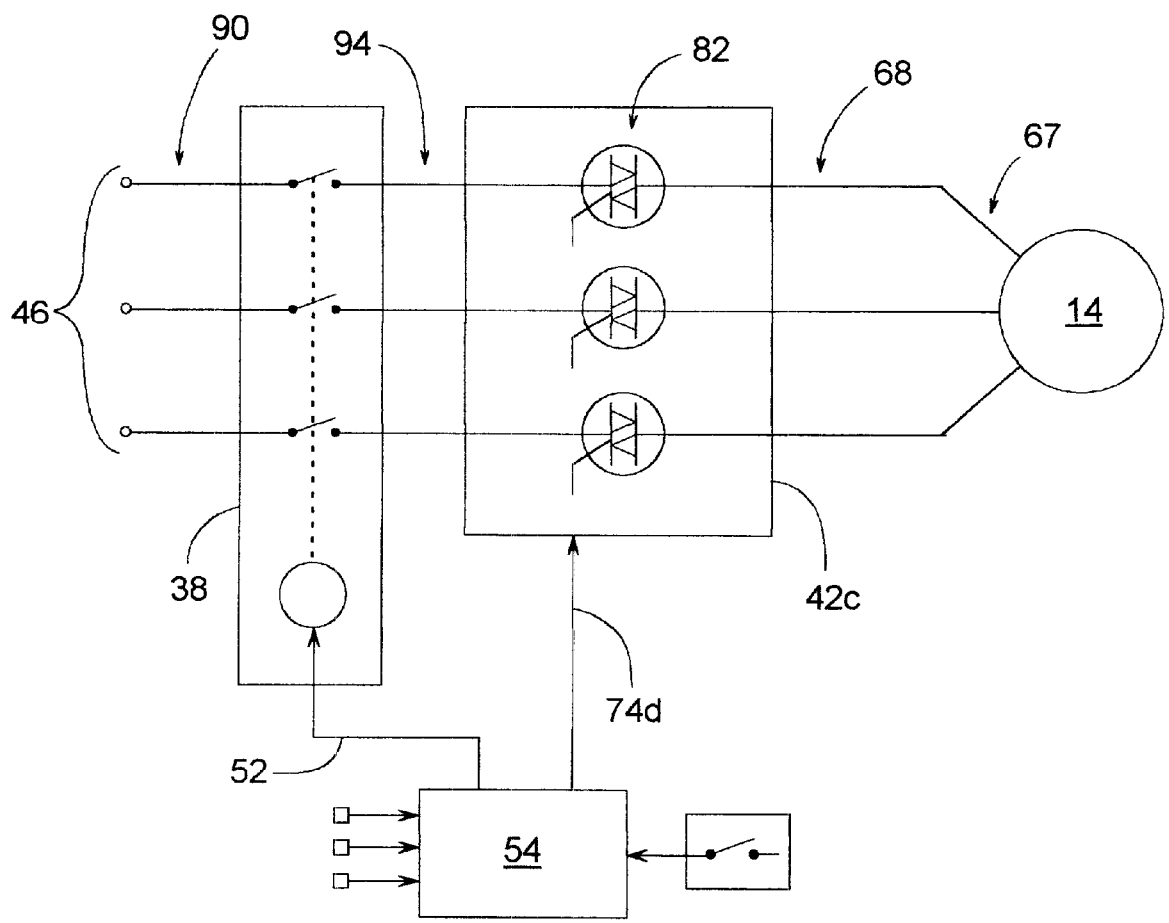
FIG. 6 is a schematic wiring diagram of a full-voltage starter, a reduced-voltage starter, and a controller, wherein the reduced-voltage starter is a solid-state starter.

Referring further to FIGS. 4–6, full-voltage starter 38 is an electromagnetic on/off switch whose operation determines whether the entire supply line-voltage 46 (e.g., 2,300 volts) or zero voltage is made available to motor 14. Full-voltage starters are well known to those skilled in the art. Cutler-Hammer, which is a business unit of Eaton Corporation of Cleveland, Ohio, is just one of many manufacturers that can provide such starters for various size motors.

Starter 38 comprises one or more sets of electrical contacts 48 (e.g., three sets for three-phase electrical power) that are actuated by a solenoid 50. Solenoid 50 is energized by a signal 52 that can be provided by a controller 54, a manually actuated switch 56, or other electrical circuitry of conventional means.

Controller 54 may be housed within a controller enclosure 58 and in some cases include a microprocessor having the logic to provide various chiller control signals in response to various inputs. The inputs may be manually entered or may be generated by one or more sensors 60 that sense an operating condition of the chiller. For example, a pressure sensor 62 may provide controller 54 with an input signal 64 that indicates the refrigerant pressure within condenser shell 26. The use of a microprocessor for chiller control is well known to those skilled in the art.

Reduced-voltage starter 42 is also an electrical or electronic switching device, but its function is to selectively apply either full line voltage 46 or a reduced voltage (e.g., 50%–70% of 2,300 volts) to motor 14. Starter 42 is schematically illustrated to represent several different types of reduced-voltage starters; some examples of which include, but are not limited to, a primary reactor 42a of FIG. 4, an autotransformer 42b of FIG. 5, and a solid-state starter 42c of FIG. 6. Reduced-voltage starters, including those just mentioned, are well known to those skilled in the art, and Cutler-Hammer is just one of many manufacturers that can provide such starters for various size motors.

Primary reactor 42a of FIG. 4 includes a resistor 66 in series with each of the motor supply lines 68 leading to motor terminals 67. A set of contacts 70 serves as a shunt across each resistor 66 to effectively add or remove the resistor from its respective line. When contacts 70 open, resistors 66 reduce the voltage on motor leads 68 for reduced-voltage starting. When contacts 70 close, the current bypasses the resistors to apply full voltage to the motor during normal operation. A solenoid 72 responsive to a signal 74a (example of signal 74 of FIGS. 1 and 2) opens or closes contacts 70. Signal 74 (e.g., signal 74a) can be controlled in response to a timer, current sensor, or other conventional means for determining when power to motor 14 should be increased from a reduced voltage to full voltage.

Autotransformer 42b of FIG. 5 comprises a transformer 76 whose primary windings are connected to receive full line voltage and whose secondary windings can apply a reduced-voltage across motor terminals 67. Electrical contacts 78 and 80 determine whether the full line voltage or the reduced-voltage is delivered to motor 14. Solenoids 78 and 80 actuate the contacts in response to one or more control signals 74b and 74c (examples of signal 74 of FIGS. 1 and 2). Signal 74 (e.g., signals 74b and 74c) can be controlled in response to a timer, current sensor, or other conventional means for determining when power to motor 14 should be increased from a reduced voltage to full voltage.

A solid-state starter 42c of FIG. 6 includes at least one solid-state electrical switching device 82 (e.g., SCR, triac, diac, power transistor, etc.) that changes the waveform of the power leading to motor 14 to deliver a reduced voltage or less power to the motor at startup, and full voltage afterwards. Starter 42c can be controlled by a signal 74d (example of signal 74 of FIGS. 1 and 2), which may be responsive to a timer, current sensor, or other conventional means for determining when power to motor 14 should be increased from a reduced voltage to full voltage.

When a single large electrical enclosure contains both starters 38 and 42, there may not always be available space to mount the single large enclosure on some chillers. So, in some embodiments, starters 38 and 42 are installed separately in two smaller enclosures, such as enclosures 40 and 44.

The reduced-voltage starter enclosure 44, the heaviest of the two, can weigh at least 600 pounds considering a plurality of components that may be contained within enclosure 44. Thus, reduced-voltage starter enclosure 44 is preferably mounted atop of condenser shell 26 for solid vertical support. A bracket 84 provides the structure to attach the generally flat-bottomed enclosure 44 to the curved top of condenser shell 26.

The full-voltage starter enclosure 40 can weigh at least 500 pounds but is still usually lighter than reduced-voltage starter enclosure 44. In some embodiments, full-voltage starter enclosure 40 is attached to the side of motor 14 with a bracket 86 and evaporator shell 30 providing additional support.

Mounting enclosures 40 and 44 at opposite sides of motor 14 (i.e., opposite sides of the motor's rotational axis 88) places the heavier enclosure 44 where it is out of the way and can be solidly supported. Such a mounting arrangement also places the full-voltage starter enclosure 40 where it is accessible to service personnel, adjacent to motor terminals 67, and convenient for feeding the main power supply lines 90 to chiller 10.

In addition, controller enclosure 58 is preferably mounted spaced apart from both starter enclosures 40 and 44 for several reasons. A separate controller enclosure provides operator convenience and helps separate relatively high line voltage (e.g., 2,000+ volts) from much lower control voltage (e.g., 120 volts or less). Separating the higher and lower voltage lines minimizes electrical noise that the higher voltage lines may otherwise induce in the lower voltage lines and provides a safer environment for service personnel. Also, since controller enclosure 58 plus it contents is relatively light (i.e., weighs less than enclosures 40 and 44), controller 58 is readily mounted off to one side of chiller 10. This places controller 54 where an operator or service personnel can readily access it.

Interconnecting enclosures 40, 44 and 58 with power and control wiring can be carried out in an unlimited number of ways. For the example shown in FIGS. 1–3, a main conduit 92 feeds the main power supply lines 90 into full-voltage starter enclosure 40 where lines 90 connect to full-voltage starter 38. Another conduit 92 extends between enclosures 40 and 44 to carry wires 94 and 68 that extend between starters 38 and 42. A conduit 96 extending between enclosures 58 and 40 carries control wiring (e.g., signal 52) that extend between controller 54 and full-voltage starter 38. Another conduit 98 extends between enclosures 40 and 58 to carry control-wiring 74 (e.g., signals 74a, 74b, 74c or 74d) between controller 54 and one of the reduced-voltage starters 42 (e.g., starters 42a, 42b or 42c). A conduit 100 can connect controller enclosure 58 to sensor 62.

It should be appreciated by those skilled in the art that the actual layout of the conduits can vary widely from the example shown in FIGS. 1–3. Conduit 98, for example, can be omitted, and control-wiring 74 can instead be fed in series through conduits 96, enclosure 40, and conduit 92. Or in some cases, another conduit can be installed to carry control-wiring between enclosure 40 and 44, thereby keeping the higher and lower voltage wiring in separate conduits.

Once enclosures 40, 44 and 58 and the interconnecting conduits are installed, chiller 10 can be transported as a single unit with the step of transporting being schematically illustrated by arrow 102 of FIG. 2.

Although the invention is described with reference to a preferred embodiment, it should be appreciated by those skilled in the art that other variations are well within the scope of the invention. Therefore, the scope of the invention is to be determined by reference to the claims, which follow.

What is claimed is:

1. A centrifugal chiller, comprising;
   an evaporator shell;
   a condenser shell extending above the evaporator shell and being horizontally off center relative thereto, wherein the evaporator shell and the condenser shell provide a combined width of between 5 feet and 8.5 feet;
   a centrifugal compressor supported by the evaporator shell to provide a combined height of between 6 feet and 12 feet, wherein the centrifugal compressor is in fluid communication with the evaporator shell and the condenser shell;
   a motor connected to the centrifugal compressor and having a rated voltage of at least 2,000 volts, wherein the motor has sufficient power to enable the centrifugal chiller to create at least 300 tons of cooling;
   a reduced-voltage starter being electrically coupled to a plurality of motor leads extending from the motor and being supported by at least one of the evaporator shell, the condenser shell, and the motor; and
   a full-voltage starter being electrically wired to the reduced-voltage starter and being supported by at least one of the evaporator shell, the condenser shell, and the motor; whereby the evaporator shell, the condenser shell, the centrifugal compressor, the motor, the full-voltage starter and the reduced-voltage starter can be transported as a single unit.

2. The centrifugal chiller of claim 1, further comprising:
   a full-voltage starter enclosure containing the full-voltage starter and mounted to at least one of the evaporator shell, the condenser shell, and the motor; and
   a reduced-voltage starter enclosure containing the reduced-voltage starter and mounted to at least one of the evaporator shell, the condenser shell, and the motor, wherein the full-voltage starter enclosure and the reduced-voltage starter enclosure are spaced apart from each other.

3. The centrifugal chiller of claim 1, wherein the motor defines a rotational axis disposed between the full-voltage starter and the reduced-voltage starter.

4. The centrifugal chiller of claim 2, wherein the full-voltage starter enclosure plus a plurality of components therein weighs at least 500 pounds.

5. The centrifugal chiller of claim 2, wherein the reduced-voltage starter enclosure plus a plurality of components therein weighs at least 600 pounds.

6. The centrifugal chiller of claim 2, wherein the reduced-voltage starter enclosure is mounted to the condenser shell.

7. The centrifugal chiller of claim 1, wherein the reduced-voltage starter comprises a primary reactor.

8. The centrifugal chiller of claim 1, wherein the reduced-voltage starter comprises an autotransformer.

9. The centrifugal chiller of claim 1, wherein the reduced-voltage starter comprises a solid-state starter.

10. The centrifugal chiller of claim 1, further comprising:
    an electrical enclosure that contains at least one of the full-voltage starter and the reduced-voltage starter;
    a controller enclosure mounted to at least one of the evaporator shell and the condenser shell and being spaced apart from the electrical enclosure;
    a controller housed within the controller enclosure; and
    at least one sensor wired to the controller and being adapted to sense an operating condition of the centrifugal chiller.

11. A method of handling a centrifugal chiller comprising:
    coupling a condenser to an evaporator, wherein the condenser extends above the evaporator and is horizontally offset relative thereto, wherein the evaporator shell and the condenser shell provide a combined width of at least 5 feet;
    supporting a centrifugal compressor atop the evaporator to provide a combined height of at least 6 feet;
    connecting a motor to the centrifugal compressor, wherein the motor has a rated voltage of at least 2,000 volts;
    placing the compressor, condenser, and evaporator in fluid communication with each other;
    supporting a full-voltage starter by way of at least one of the condenser, the evaporator, and the motor;
    electrically coupling the full-voltage starter to a plurality of motor leads extending from the motor;
    supporting a reduced-voltage starter by way of at least one of the condenser, the evaporator, and the motor;
    electrically coupling the reduced-motor starter to the full-voltage starter; and
    transporting the condenser, the evaporator, the compressor, the motor, the full-voltage starter, and the reduced-voltage starter as a single unit.

12. The method of claim 11, further comprising:
    housing the full-voltage starter within a full-voltage starter enclosure;
    supporting the full-voltage starter enclosure by way of at least one of the condenser, the evaporator, and the motor;
    housing the reduced-voltage starter within a reduced-voltage starter enclosure;
    supporting the reduced-voltage starter enclosure by way of at least one of the condenser, the evaporator, and the motor; and
    placing the full-voltage starter in a spaced-apart relationship to the reduced-voltage starter.

13. The method of claim 11, further comprising:
    defining a rotational axis of the motor; and
    placing the full-voltage starter and the reduced-voltage starter at opposite sides of the rotational axis of the motor.

14. The method of claim 12, further comprising mounting the reduced-voltage starter enclosure to the condenser.

15. The method of claim 12, further comprising:
    mounting a controller enclosure to at least one of the evaporator shell and the condenser shell such that the controller enclosure is spaced apart from the full-voltage starter enclosure and the reduced-voltage starter enclosure;
    installing a controller within the controller enclosure; and
    using the controller to sense an operating condition of the centrifugal chiller.

16. A method of delivering electrical power to a motor of a centrifugal chiller, comprising:
    conveying electrical power at a supply voltage to a full-voltage starter enclosure, wherein the full-voltage starter enclosure is adjacent to the motor;
    conveying the electrical power from the full-voltage starter enclosure to a reduced-voltage starter enclosure that is spaced apart from the full-voltage starter enclosure;
    conveying the electrical power from the reduced-voltage starter enclosure back to the full-voltage starter enclosure but doing so at a reduced voltage that is appreciably lower than the supply voltage; and
    conveying the electrical power at the reduced voltage from the full-voltage starter enclosure to the motor.

17. The method of claim 16, wherein the supply voltage is greater than 2,000 volts.

18. The method of claim 16, further comprising operating the centrifugal chiller to provide at least 300 tons of cooling.

19. The method of claim 16, wherein the full-voltage starter enclosure plus a plurality of components therein weighs at least 500 pounds.

20. The method of claim 16, wherein the reduced voltage starter enclosure plus a plurality of components therein weighs at least 600 pounds.

* * * * *